(12) United States Patent
Hintermeister et al.

(10) Patent No.: US 7,395,403 B2
(45) Date of Patent: Jul. 1, 2008

(54) SIMULATING PARTITION RESOURCE ALLOCATION

(75) Inventors: Gregory Richard Hintermeister, Rochester, MN (US); Cale T. Rath, Byron, MN (US); George James Romano, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 11/201,973

(22) Filed: Aug. 11, 2005

(65) Prior Publication Data

US 2007/0038836 A1 Feb. 15, 2007

(51) Int. Cl.
*G06F 12/00* (2006.01)
(52) U.S. Cl. .......................... 711/173; 711/6; 711/170; 711/171; 711/172
(58) Field of Classification Search ........................ None
See application file for complete search history.

(56) References Cited

U.S. PATENT DOCUMENTS 4,939,507 A * 7/1990 Beard et al. ................. 345/156

\* cited by examiner

*Primary Examiner*—Reginald G. Bragdon
*Assistant Examiner*—Shawn X Gu
(74) *Attorney, Agent, or Firm*—Owen J. Gamon (57) ABSTRACT

A method, apparatus, system, and signal-bearing medium that, in an embodiment, simulate allocation of a simulated resource to simulated partitions in a simulated logically-partitioned computer and determine whether the allocation conflicts. The simulation may include summing amounts of the simulated resource for the simulated partition in an order, where the order of the simulated partitions is received via a user interface. In various embodiments, the allocation may conflict if the allocation exceeds the capacity of the simulated logically-partitioned computer or if the simulated resource is restricted to exclusive allocation. The result of the simulation, including whether the allocation conflicts, is presented via the user interface. In various embodiments, the simulated resource may be memory, an I/O controller, or a storage device.

14 Claims, 6 Drawing Sheets

SIMULATION RESULTS

PARTITION B
PROCESSOR X,Y
CONTROLLER D
220 GB

PARTITION C
PROCESSOR Y,Z
CONTROLLER D, E
44 GB

PARTITION C CANNOT BE STARTED BECAUSE
CONTROLLER D IS ALLOCATED TO PARTITION B

| PLAN DATA ||||||
|---|---|---|---|---|---|
| PARTITION ID ⌐420 | PROCESSOR ⌐425 | MEMORY ⌐430 | I/O CONTROLLER ⌐435 | STORAGE DEVICE ⌐440 | |
| PARTITION A | PROCESSOR X | 10 GB | CONTROLLER C | 500 GB | 405 |
| PARTITION B | PROCESSOR X,Y | 22 GB | CONTROLLER D | 250 GB | 410 |
| PARTITION C | PROCESSOR Y,Z | 44 GB | CONTROLLER D, E | 325 GB | 415 |

| SYSTEM DESCRIPTION ||||
|---|---|---|---|
| PROCESSORS ⌐450 | MEMORY ⌐455 | I/O CONTROLLER ⌐460 | STORAGE DEVICE ⌐470 |
| 5 | 50 GB | CONTROLLER C, D, E, F | 2000 GB |

SIMULATING PARTITION RESOURCE ALLOCATION

FIELD

An embodiment of the invention generally relates to computers. In particular, an embodiment of the invention generally relates to simulating the allocation of resources to partitions in a logically-partitioned computer.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful than just a few years ago.

Because of the power and complexity of computer systems, purchasing or upgrading a computer system is a difficult task. A customer must determine the proper computer system, software, and features to purchase (including the size, speed, or capacity of various devices), order the computer system and its features, and configure and install the computer system. Users often experience great difficulty in determining whether they are purchasing the correct computer system that will have enough capacity and power to run their applications and store their data, now and in the future.

These difficulties are exacerbated when the computer system uses logical partitions. In a logically-partitioned computer system, a single physical computer operates essentially like multiple and independent virtual computers, referred to as logical partitions, with the various resources in the physical computer (e.g., processors, memory, storage devices, and input/output controllers and devices) allocated among the various logical partitions. Each logical partition executes a separate operating system, and from the perspective of users and of the software applications executing on the logical partition, operates as a fully independent computer. The separate logical partitions typically operate under the control of a partition manager or hypervisor. Planning, ordering, configuring, and installing a logically-partitioned computer is even more difficult than a non-partitioned computer because the logically-partitioned computer may have multiple operating systems, each partition may be allocated only a portion of the resources of the computer system, and the partitions must be planned for and configured.

Multiple partitions may be defined that are allocated resources in such a way that all of the partitions may not be started at the same time. Thus, the computer's resources may be oversubscribed, i.e., the allocation conflicts. For example, the memory allocated to the partitions may exceed the memory capacity of the computer, or an I/O (Input/Output) controller may be allocated to multiple partitions, but it is capable of being used by only one partition at a time; hence, the resource allocations conflict or are oversubscribed.

This oversubscribing concept provides the advantage that it allows a single computer system to have multiple virtual images of partition combinations that can be activated at different times to allow a single hardware footprint to provide completely different resources, depending on the combinations of partitions that are activated. But, oversubscribing resources to partitions also has the disadvantage that the customer may experience difficulty in knowing which combinations of partitions are capable of being activated at the same time, and which are not, without actually buying the computer and the resources and attempting to activate the partitions.

Hence, a need exists for a technique that is capable of defining partitions that oversubscribe a computer system's resources and can also determine which combination of partitions are supported on that computer system.

SUMMARY

A method, apparatus, system, and signal-bearing medium are provided that, in an embodiment, simulate allocation of a simulated resource to simulated partitions in a simulated logically-partitioned computer and determine whether the allocation conflicts. The simulation may include summing amounts of the simulated resource for the simulated partition in an order, where the order of the simulated partitions is received via a user interface. In various embodiments, the allocation may conflict if the allocation exceeds the capacity of the simulated logically-partitioned computer or if the simulated resource is restricted to exclusive allocation. The result of the simulation, including whether the allocation conflicts, is presented via the user interface. In various embodiments, the simulated resource may be memory, an I/O controller, or a storage device.

BRIEF DESCRIPTION OF THE DRAWING

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

In an embodiment, a partition planning tool simulates allocation of a simulated resource to simulated partitions in a simulated logically-partitioned computer and determine whether the allocation conflicts. The simulation may include summing amounts of the simulated resource for the simulated partition in an order, where the order of the simulated partitions is received via a user interface. In various embodiments, the allocation may conflict if the allocation exceeds the capacity of the simulated logically-partitioned computer or if the simulated resource is restricted to exclusive allocation. The result of the simulation, including whether the allocation conflicts, is presented via the user interface. In various embodiments, the simulated resource may be memory, an I/O controller, or a storage device. An embodiment of the invention provides a function that allows for the planning and validation of partition resources that are oversubscribed. An embodiment of the invention simulates the start up or initialization of simulated partitions, in order to validate how the partitions interact. It allows partitions to be grouped and their allocations simulated. The tool user can then react and adjust the partitions or add/remove planned hardware resources until the desired result is achieved.

Figure 1A:
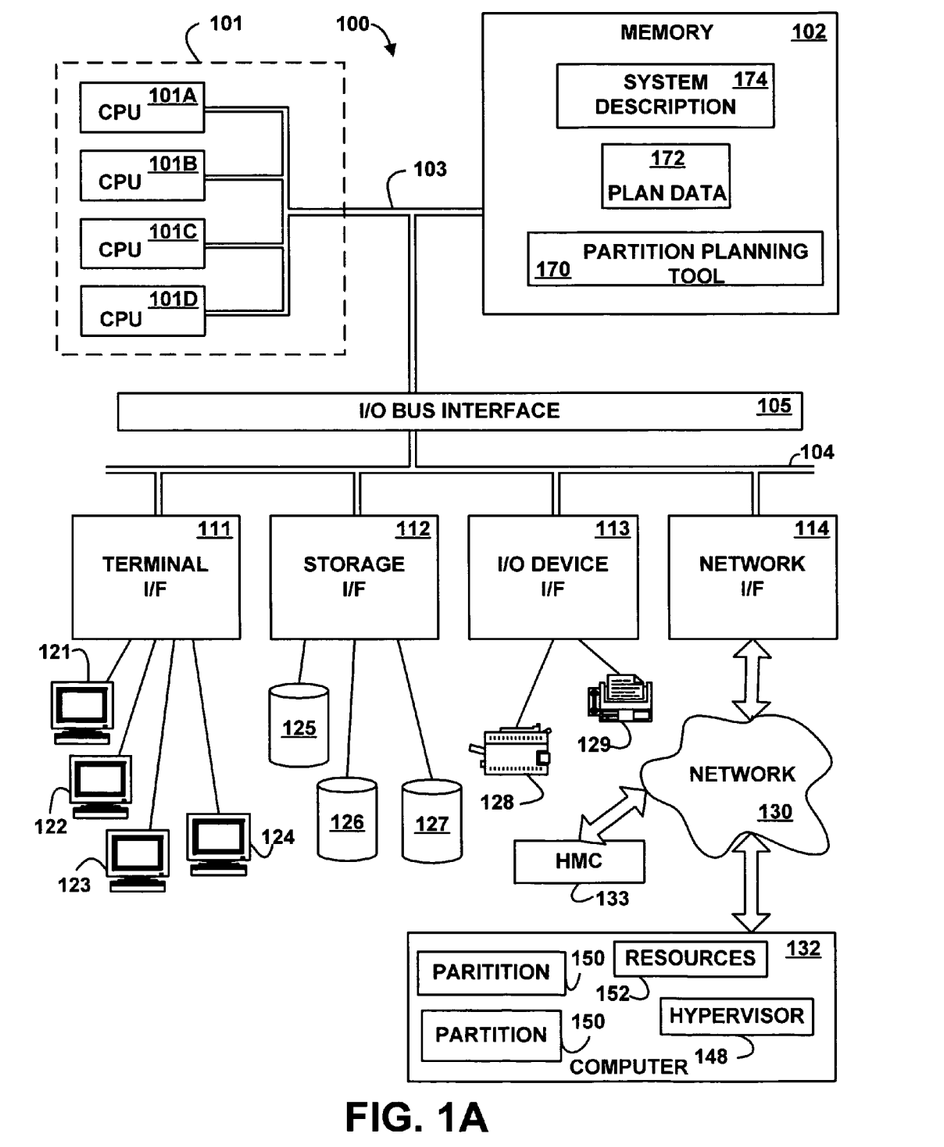
FIG. 1A depicts a block diagram of an example system for implementing an embodiment of the invention.

Referring to the Drawings, wherein like numbers denote like parts throughout the several views, FIG. 1A depicts a high-level block diagram representation of a client computer system 100 connected via a network 130 to a computer system 132 and a hardware management console 133, according to an embodiment of the present invention. The terms "computer system" and "client" are used for convenience only, any appropriate electronic devices may be used, and in various embodiments a computer system or electronic device that operates as a client in one context may operate as a server in another context. The major components of the client computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The client computer system 100 contains one or more general-purpose programmable central processing units (CPUs) 101A, 101B, 101C, and 101D, herein generically referred to as a processor 101. In an embodiment, the client computer system 100 contains multiple processors typical of a relatively large system; however, in another embodiment the client computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The main memory 102 includes a partition planning tool 170, plan data 172, and a system description 174. Although the partition planning tool 170, the plan data 172, and the system description 174 are illustrated as being contained within the memory 102 in the client computer system 100, in other embodiments some or all of them may be on different computer systems and may be accessed remotely, e.g., via the network 130. The client computer system 100 may use virtual addressing mechanisms that allow the programs of the client computer system 100 to behave as if they only have access to a large, single storage entity instead of access to multiple, smaller storage entities. Thus, while the partition planning tool 170, the plan data 172, and the system description 174 are illustrated as being contained within the main memory 102, these elements are not necessarily all completely contained in the same storage device at the same time. Further, although the partition planning tool 170, the plan data 172, and the system description 174 are illustrated as being separate entities, in other embodiments some of them, or portions of some of them, may be packaged together.

The partition planning tool 170 uses the plan data 172 to simulate allocation of resources to partitions in the computer system 132. The plan data 172 is further described below with reference to FIG. 4A. The partition planning tool 170 uses the system description 174 to simulate the computer system 132. The system description 174 is further described below with reference to FIG. 4B.

In an embodiment, the partition planning tool 170 includes instructions stored in the memory 102 capable of executing on the processor 101 or statements capable of being interpreted by instructions executing on the processor 101 to perform the functions as further described below with reference to FIG. 5. In another embodiment, the partition planning tool 170 may be implemented in microcode or firmware. In another embodiment, the partition planning tool 170 may be implemented in hardware via logic gates and/or other appropriate hardware techniques.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O and other device interface 113 provides an interface to any of various other input/output devices or devices of other types. Two such devices, the printer 128 and the fax machine 129, are shown in the exemplary embodiment of FIG. 1A, but in other embodiment many other such devices may exist, which may be of differing types. The network interface 114 provides one or more communications paths from the client computer system 100 to other digital devices and computer systems; such paths may include, e.g., one or more networks 130.

Although the memory bus 103 is shown in FIG. 1A as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the client computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The client computer system 100 depicted in FIG. 1A has multiple attached terminals 121, 122, 123, and 124, such as might be typical of a multi-user "mainframe" computer system. Typically, in such a case the actual number of attached devices is greater than those shown in FIG. 1A, although the present invention is not limited to systems of any particular size. The client computer system 100 may alternatively be a single-user system, typically containing only a single user display and keyboard input, or might be a server or similar device which has little or no direct user interface, but receives requests from other computer systems (clients). In other embodiments, the client computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the client computer system 100, the computer system 132, and/or the hardware management console 133. In various embodiments, the network 130 may represent a storage device or a combination of storage devices, either connected directly or indirectly to the client computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

The computer system 132 includes a hypervisor 148, logical partitions 150, and resources 152. The computer system 132 and the hardware management console 133 may further include any or all of the hardware and/or software components previously described above for the computer 100. The hardware management console 133 configures the partitions 150 in the computer system 132 based on the plan data 172.

The computer system 132 provides a logically-partitioned computing environment, including any number of logical partitions 150 managed by the hypervisor 148. Each of the logical partitions 150 utilizes an unillustrated operating system, which controls the primary operations of the logical partition 150 in the same manner as the operating system of a non-partitioned computer. For example, each operating system may be implemented using the i5OS operating system available from International Business Machines Corporation, but in other embodiments the operating system may be Linux, AIX, UNIX, Microsoft Windows, or any appropriate operating system. Also, some or all of the operating systems may be the same or different from each other. Any number of logical partitions 150 may be supported as is well known in the art, and the number of the logical partitions 150 resident at any time in the computer 132 may change dynamically as the partitions 150 are added or removed from the computer 132.

Each of the logical partitions 150 executes in a separate, or independent, memory space, and thus each logical partition 150 acts much the same as an independent, non-partitioned computer from the perspective of each unillustrated application that executes in each such logical partition. As such, applications typically do not require any special configuration for use in a partitioned environment. Given the nature of logical partitions 150 as separate virtual computers, it may be desirable to support inter-partition communication to permit the logical partitions 150 to communicate with one another as if the logical partitions 150 were on separate physical machines. Although the logical partitions 150 are illustrated as operating as virtual computers within the computer 132, in another embodiment, one of the logical partitions 150 may operate as the entire computer, or as a group of computers, such as one or more servers connected via the network 130.

In some embodiments, the partitions 150 may support unillustrated virtual local area network (LAN) adapters to permit the logical partitions 150 to communicate with one another and/or the client computer system 100 and the hardware management console 133 via a networking protocol such as the Ethernet protocol. In another embodiment, the virtual network adapter may bridge to a physical adapter. Other manners of supporting communication between partitions 150, the client computer system 100, and the hardware management console 133 may also be supported consistent with embodiments of the invention.

The hypervisor 148 may be included within memory, firmware, or hardware. The hypervisor 148 may perform both low-level partition management functions, such as page table management and may also perform higher-level partition management functions, such as creating and deleting partitions, concurrent I/O maintenance, allocating the resources 152 (e.g., processors, memory, storage devices, and I/O controllers) to the various partitions 150.

The hypervisor 148 statically and/or dynamically allocates to each logical partition 150 a portion of the available resources 152 in the computer system 132. For example, each logical partition 150 may be allocated one or more of the processors and/or one or more hardware threads, as well as a portion of the available memory space, storage devices, and I/O devices. The logical partitions 150 can share specific software and/or hardware resources such as processors, such that a given resource may be utilized by more than one logical partition. In the alternative, software and hardware resources can be allocated to only one logical partition 150 at a time. Additional resources, e.g., mass storage, backup storage, user input, network connections, and the I/O adapters therefor, are typically allocated to one or more of the logical partitions 150. Resources may be allocated in a number of manners, e.g., on a bus-by-bus basis, or on a resource-by-resource basis, with multiple logical partitions sharing resources on the same bus. Some resources may even be allocated to multiple logical partitions at a time. The resources identified herein are examples only, and any appropriate resource capable of being allocated may be used. In various embodiments, the resources 152 may represent processor(s) analogous to the processor 101, storage device(s) analogous to the storage devices 125, 126, and 127, memory analogous to the memory 102, or I/O controller(s) analogous to the controllers 111, 112, 113, and 114, as further described below with reference to FIG. 1B.

Although the computer system 132 and the hardware management console 133 are illustrated as being connected to the client computer system 100 via the network 130 and the network interface 114, in another embodiment, one or both of them may be connected to the client computer system 100 via a virtual network adapter without the benefit of the network interface 114 and/or the network 130. Although the client computer system 100, the computer system 132, and the hardware management console 133 are illustrated as being separate, in another embodiment they, or any portion thereof, may be packaged together. Although the network 130, the computer system 132, and the hardware management console 133 are illustrated in FIG. 1A, their presence is optional and not necessary to an embodiment of the invention because the partition planning tool 170 simulates the allocation of simulated resources (simulating the resources 152) to simulated partitions (simulating the partitions 150), in a simulated computer system (simulating the computer system 132) as further described below.

It should be understood that FIG. 1A is intended to depict the representative major components of the client computer system 100, the network 130, the computer system 132, and the hardware management console 133 at a high level, that individual components may have greater complexity than represented in FIG. 1A, that components other than or in addition to those shown in FIG. 1A may be present, and that the number, type, and configuration of such components may vary. Several particular examples of such additional complexity or additional variations are disclosed herein; it being understood that these are by way of example only and are not necessarily the only such variations.

The various software components illustrated in FIG. 1A and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions or statements that are resident at various times in various memory and storage devices in the client computer system 100, and that, when read and executed by one or more processors, e.g., the processor 101 in the client computer system 100, cause the client computer system 100 to perform the steps, elements, or functions comprising the various aspects of embodiments of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the client computer system 100 via a variety of tangible signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a transmissions or communications medium, such as through a computer or a telephone network, e.g., the network 130.

Such tangible signal-bearing media, when carrying or encoding processor-readable, computer-readable, or machine-readable instructions or statements that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1A are not intended to limit the present invention. Indeed, other alternative hardware and/or software environments may be used without departing from the scope of the invention.

Figure 1B:
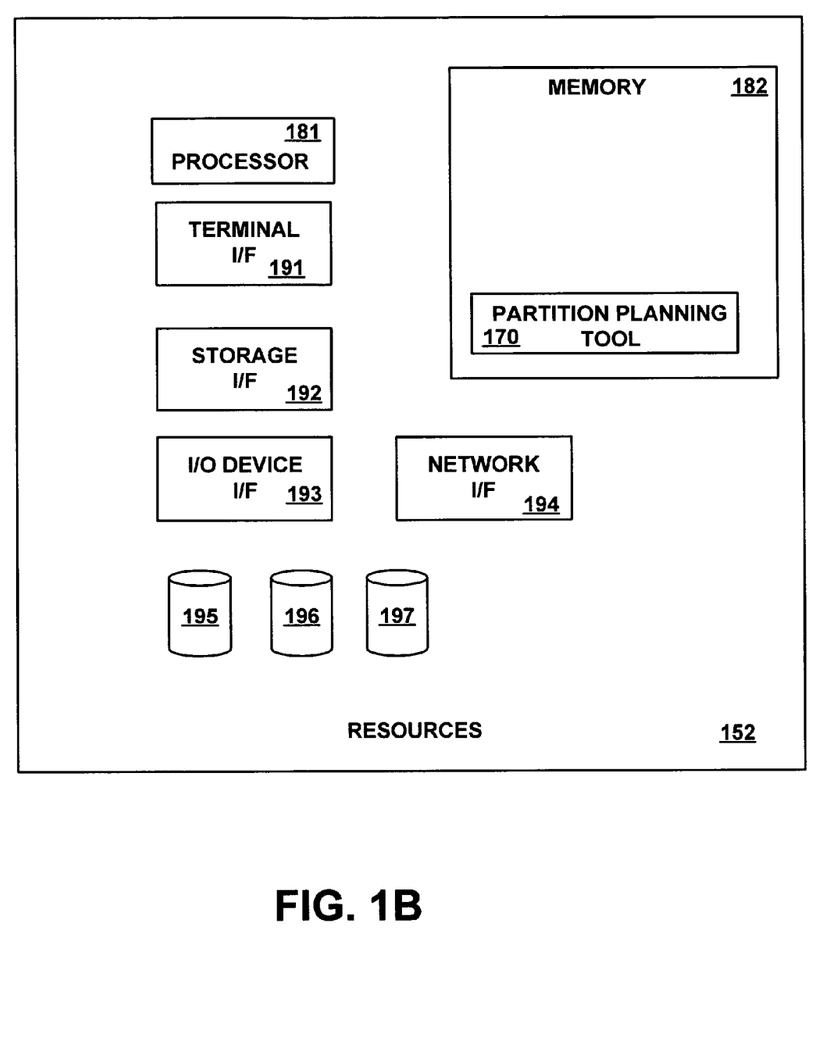
FIG. 1B depicts a block diagram of example resources, according to an embodiment of the invention.

FIG. 1B depicts a block diagram of the example resources 152 of the computer 132 (FIG. 1A), according to an embodiment of the invention. The example resources 152 include a processor 181 (analogous to the processor 101 in FIG. 1A), storage devices 195, 196, and 197 (analogous to the storage devices 125, 126, and 127 in FIG. 1A), memory 182 (analogous to the memory 102 in FIG. 1A), and interface controllers 191, 192, 193, and 194 (analogous to the interface controllers 111, 112, 113, and 114 in FIG. 1A). Since the resources 152 are simulated by the partition planning tool, the existence of the resources 152 is not necessary to an embodiment of the invention. But, if the resources 152 do exist, in an embodiment, the partition planning tool 170 may exist in the memory 182 and execute on the processor 181 since the partition planning tool 170 may exist on any appropriate computing device.

Figure 2A:
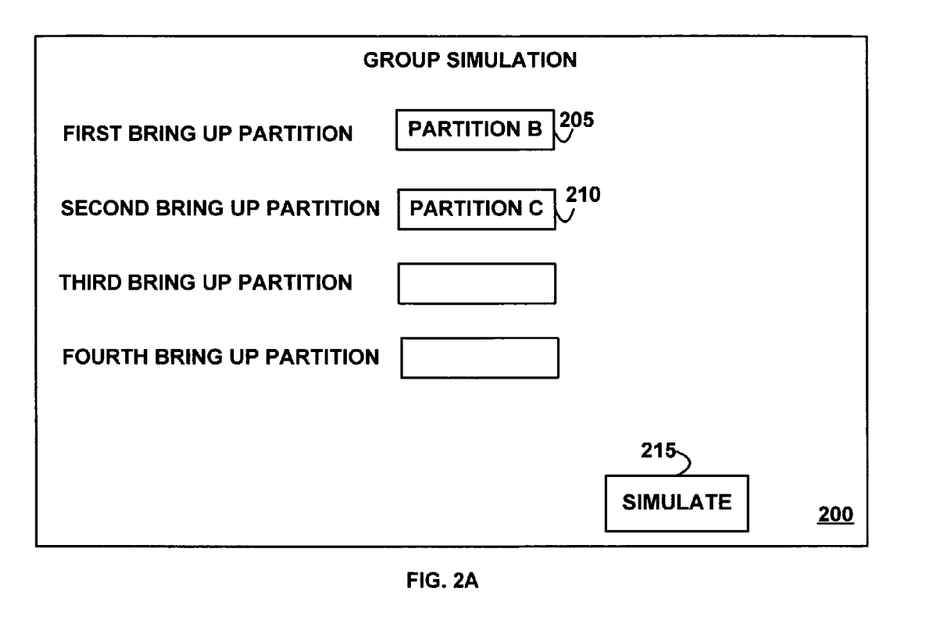
FIG. 2A depicts a block diagram of an example group simulation user interface, according to an embodiment of the invention.

FIG. 2A depicts a block diagram of an example group simulation user interface 200, according to an embodiment of the invention. The group simulation user interface 200 includes a specification of partitions that are to be simulated and an order that the resources 152 are to be allocated to the simulated partitions (the order that the partitions are to be brought up or initialized). For example, the order specified by the example group simulation user interface is that the first bring up partition 205 is the first simulated partition to which the partition planning tool 170 simulates allocating the simulated resources, and the second bring up partition 210 is the second simulated partition to which the partition planning tool 170 simulates allocating the simulated resources. The group simulation user interface 200 further includes a simulate button 215. The selection of the simulate button 215 causes the partition planning tool 170 to simulate the allocation of resources to the partitions, as further described below with reference to FIG. 5.

Figure 2B:
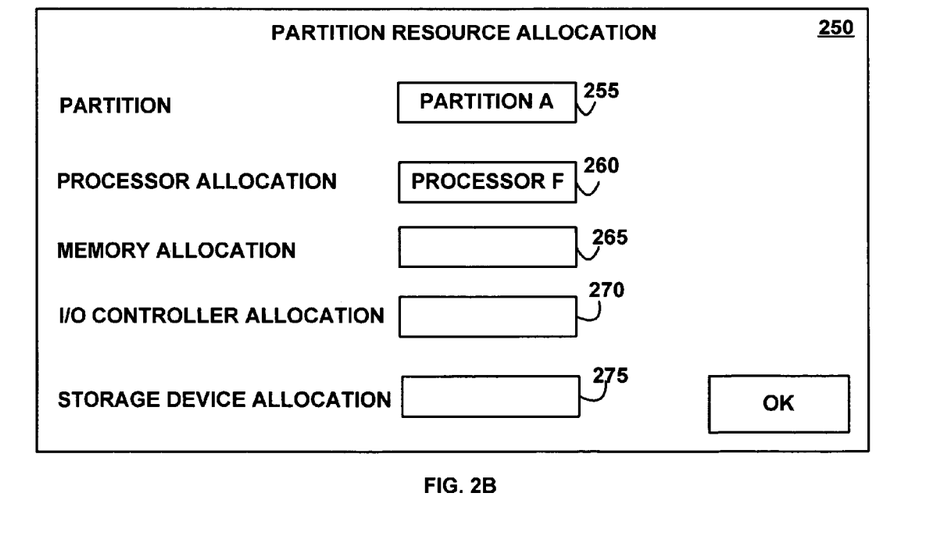
FIG. 2B depicts a block diagram of an example partition resource allocation user interface, according to an embodiment of the invention.

FIG. 2B depicts a block diagram of an example partition resource allocation user interface 250, according to an embodiment of the invention. The partition resource allocation user interface 250 provides the ability for a user to request an allocation or a change to an allocation of simulated resources to simulated partitions as specified in the plan data 172. For example, the user can request allocation of processors 260, memory 265, I/O controllers 270, or storage devices 275, to the specified partition 255.

By utilizing the user interfaces of FIGS. 2A and 2B, users are given the opportunity to input data and request functions of the partition planning tool 170 to determine which combination of partitions are capable of being activated at the same time, and which are not. For the combinations of multiple partitions that cannot be started at the same time, the user may input adjustments to the resource allocation via the interface 250 that may allow the partitions to be started at the same time.

Figure 3:
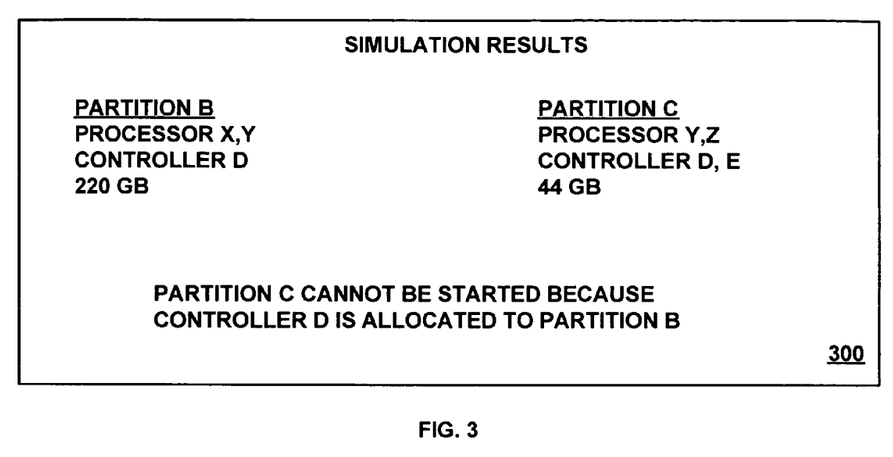
FIG. 3 depicts a block diagram of an example simulation results user interface, according to an embodiment of the invention.

FIG. 3 depicts a block diagram of an example simulation results user interface 300, according to an embodiment of the invention. The simulation results user interface 300 presents the results of the simulation of allocation of simulated resources (representing the resources 152) to simulated partitions (representing the partitions 150). The results indicates whether or not the simulated partitions are capable of being activated at the same time and the allocation conflict if such a conflict between the partitions exists.

Figure 4A:
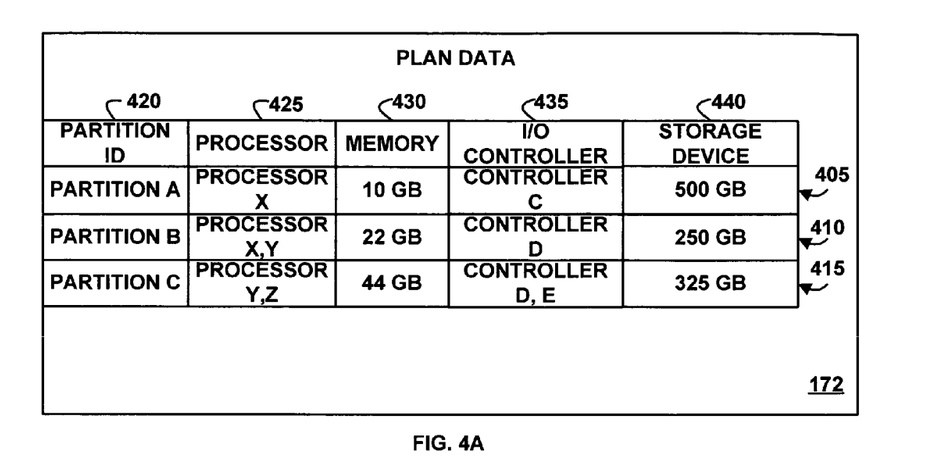
FIG. 4A depicts a block diagram of an example data structure for plan data, according to an embodiment of the invention.

FIG. 4A depicts a block diagram of an example data structure for the plan data 172, according to an embodiment of the invention. The plan data 172 includes records 405, 410, and 415, but in other embodiments any number of records with any appropriate data may be present. Each of the records 405, 410, and 415 includes a partition identifier field 420, a processor field 425, a memory field 430, and I/O controller field 435, and a storage device field 440, but in other embodiments any number of fields may be present. The fields 425, 430, 435, and 440 simulate allocation of their specified simulated resources (simulating the resources 152 in the computer 132) to the associated simulated partition 420 in the same record.

The partition identifier field 420 simulates the indicated partition 150 in the computer 132. The processor field 425 simulates the allocation of the indicated simulated processor to the partition 420. The memory field 430 simulates the allocation of the indicated amount of memory to the partition 420. The I/O controller field 435 simulates the allocation of the indicated I/O controller to the partition 420. The storage device field 440 simulates the allocation of the indicated amount of storage to the partition 420.

For example, the record 405 simulates the allocation of processor X, 10 GB of memory, controller C, and 500 GB of storage to partition A; the record 410 simulates the allocation of processors X and Y, 22 GB of memory, controller D, and 250 GB of storage to partition B; and the record 415 simulates the allocation of processors Y and Z, 44 GB of memory, controllers D and E, and 325 GB of storage to partition C.

In various embodiments, some or all of the simulated allocations may or may not be possible to perform at the same time and may depend on the order in which the resources are allocated to the partitions by the partition planning tool 170 because some or all of the resource allocations may conflict. In an embodiment, some of the resources may be allocated to multiple partitions at the same time. For example, memory or storage devices are typically, but not necessarily, allocated to multiple partitions, so long as the sum of the allocation amounts does not exceed the total memory or storage capacity available. In an embodiment, some resources are restricted to exclusive allocation to a single partition. For example, an I/O controller is typically, but not necessarily, exclusively allocated to a single partition at one time.

Figure 4B:
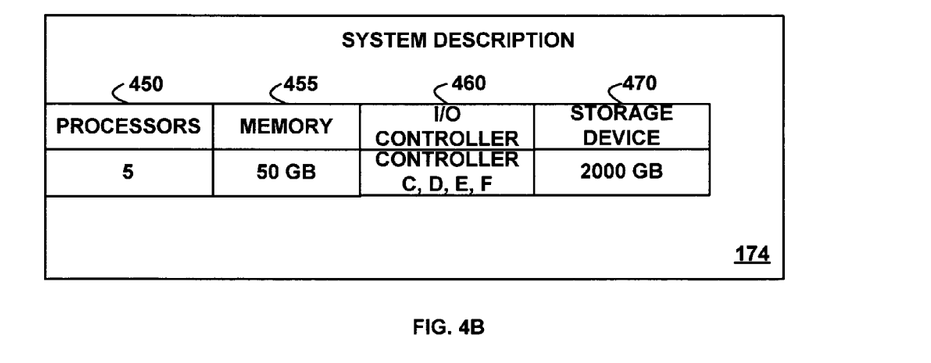
FIG. 4B depicts a block diagram of an example data structure for a system description, according to an embodiment of the invention.

FIG. 4B depicts a block diagram of an example data structure for the system description 174, according to an embodiment of the invention. The system description 174 simulates the capacity of the resources 152 of a simulated logically-partitioned computer that represents the computer system 132. The system description 174 includes a number of processors capacity field 450, a memory capacity field 455, a controller capacity field 460, and a storage device capacity field 470. The number of processors capacity field 450 simulates the number of processors present in a simulated computer that represents the computer system 132. The memory field 455 simulates the amount of memory present (the memory capacity) in a simulated computer that represents the computer system 132. The controller capacity field 460 simulates the I/O controllers present in the simulated computer that represents the computer system 132.

Figure 5:
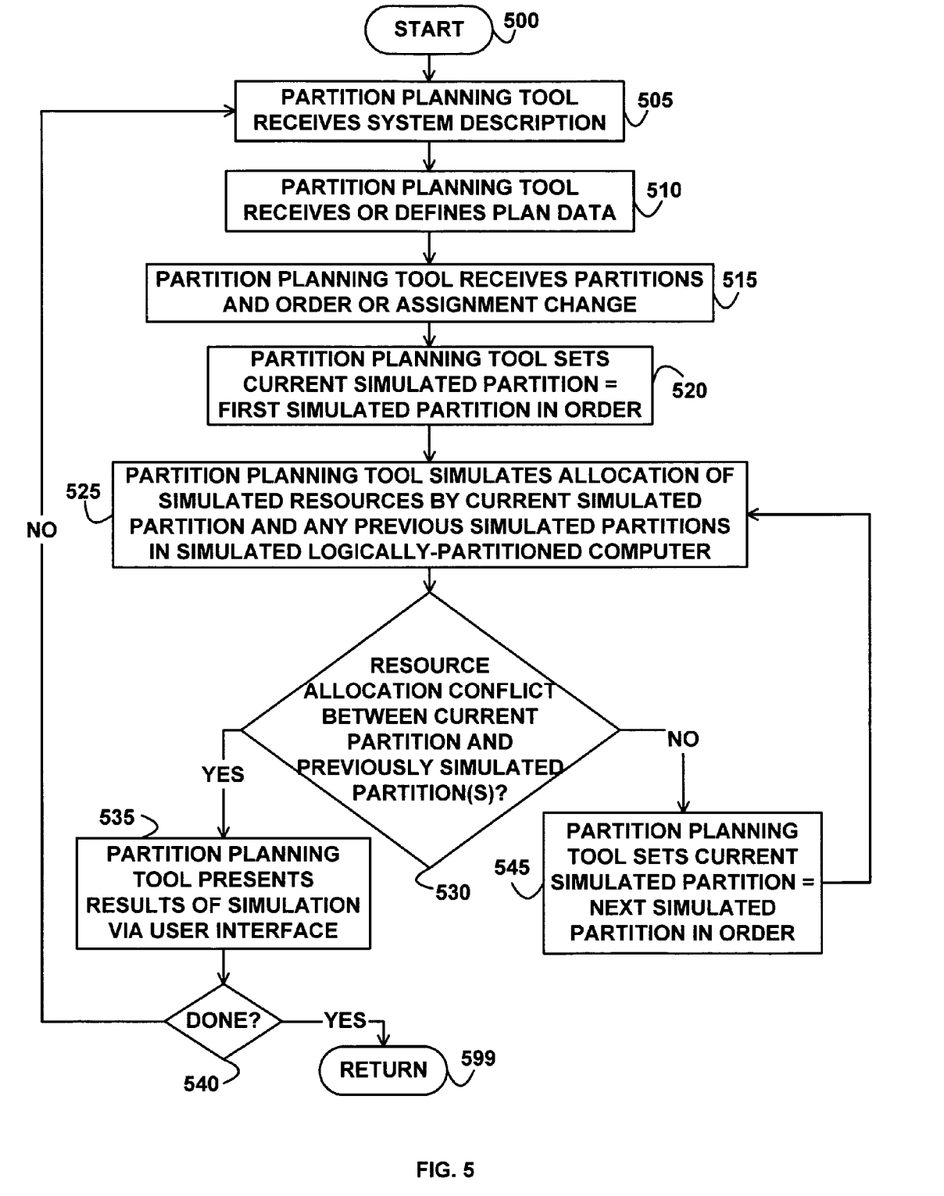
FIG. 5 depicts a flowchart of example processing for a partition planning tool, according to an embodiment of the invention.

FIG. 5 depicts a flowchart of example processing for a partition planning tool 170, according to an embodiment of the invention. Control begins at block 500. Control then continues to block 505 where the partition planning tool 170 receives the system description 174. In various embodiments, the partition planning tool 170 receives the system description 174 from a user, a system administrator, or from any appropriate program.

Control then continues to block 510 where the partition planning tool 170 receives or defines the plan data 172. In an embodiment, the partition planning tool receives the plan data 172 via the user interface 250, as previously described above with reference to FIG. 2B. In another embodiment, the partition planning tool 170 creates the plan data 172 based on requirements received from a user, a system administrator, or via any appropriate program.

Control then continues to block 515 where the partition planning tool 170 receives identification of the partitions that are to be simulated and an order that the partitions are to be simulated, initialized, or brought up, as previously described above with reference to FIG. 2A. In another embodiment, the partition planning tool 170 receives a change to the assignment or allocation of simulated resources to the simulated partitions via the user interface 250, as previously described above with reference to FIG. 2B.

Control then continues to block 520 where the partition planning tool 170 sets the current simulated partition to be the first simulated partition in the order specified in the user interface 200, as previously described above with reference to FIG. 2A for example, the first simulated partition in FIG. 2A is the partition 205. Control then continues to block 525 where the partition planning tool 170 finds the record in the plan data 172 that is associated with the current partition via the partition identifier 420 and simulates allocation of the simulated resources indicated in the found record, as previously described above with reference to FIG. 4A. In an embodiment, the partition planning tool 170 simulates the allocation by summing or adding the allocation amounts, as specified in the plan data 172, of the simulated partitions for the simulated resource if the simulated resource is capable of being allocated to multiple partitions, as specified in the plan data 172.

Control then continues to block 530 where the partition planning tool 170 determines whether a resource allocation conflict exists between the current partition and any or all previously simulated partition(s). In an embodiment, the partition planning tool 170 determines whether the summed allocation (previously determined at block 525) exceeds the resource capacity of the simulated logically-partitioned computer (specified in the system description 174). In another embodiment, the partition planning tool 170 determines whether the simulated resource has already been allocated to a previously simulated partition if the simulated resource is intended to be restricted to exclusive allocation to a single partition at a time.

If the determination at the block 530 is true, then control continues to block 535 where the partition planning tool 170 presents results of the simulation via the user interface 300, as previously described above with reference to FIG. 3. Control then continues to block 540 where the partition planning tool 170 determines whether simulation is complete. If the determination at block 540 is true, then simulation is complete, so control continues to block 599 where the logic of FIG. 5 returns.

If the determination at block 540 is false, then control returns to block 505 where the partition planning tool 170 optionally receives another system description 174 or modifications to the system description. Control then continues to block 510 where the partition planning tool 170 optionally receives new plan data 172 or modifications to the plan data 172 via the user interface 250. Control then continues to block 515 as previously described above.

If the determination of block 530 is false, then control continues to block 545 where the partition planning tool 170 sets the current simulated partition to be the next simulated partition in the order specified in FIG. 2A. Control then returns to block 525, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
   simulating allocation of a simulated resource to a plurality of simulated partitions in a simulated logically-partitioned computer, wherein the plurality of simulated partitions share allocation of a same simulated processor, wherein the simulated resource, the simulated processor, and the plurality of simulated partitions are simulated by fields in a data structure, wherein the simulating further comprises summing allocation amounts for the simulated resource for the plurality of simulated partitions, wherein the summing is performed in an order that the plurality of simulated partitions are to be initialized;
   determining, based on the simulating, whether the allocation conflicts; and
   presenting an indication of whether the plurality of simulated partitions are capable of being activated at a same time via a user interface, wherein the plurality of simulated partitions are incapable of being activated at the same time when the allocation conflicts.

2. The method of claim 1, wherein the determining further comprises:
   determining whether the allocation exceeds capacity of the simulated logically-partitioned computer.

3. The method of claim 1, wherein the determining further comprises:
   determining whether the simulated resource is restricted to exclusive allocation.

4. The method of claim 3, wherein the determining based on the simulating whether the allocation conflicts further comprises:
   determining that the simulated resource has already been allocated to a previously simulated partition and that the simulated resource is restricted to the exclusive allocation.

5. The method of claim 1, further comprising:
   receiving the order via the user interface.

6. The method of claim 1, further comprising:
   receiving adjustments to the allocation amounts.

7. The method of claim 1, wherein the simulated resource comprises simulated memory.

8. The method of claim 1, wherein the simulated resource comprises a simulated I/O controller.

9. The method of claim 1, wherein the simulated resource comprises a simulated storage device.

10. A method for configuring a client computer, comprising:
    configuring the client computer to simulate allocation of a simulated resource to a plurality of simulated partitions in a simulated logically-partitioned computer, wherein the plurality of simulated partitions share allocation of a same simulated processor, wherein the simulated resource, the simulated processor, and the plurality of simulated partitions are simulated by fields in a data structure, wherein the configuring the client computer to simulate further comprises configuring the client computer to sum allocation amounts for the simulated resource for the plurality of simulated partitions, wherein the sum is performed in an order that the plurality of simulated partitions are to be initialized;
    configuring the client computer to determine whether the allocation conflicts; and
    configuring the client computer to present an indication of whether the plurality of simulated partitions are capable of being activated at a same time via a user interface, wherein the plurality of simulated partitions are incapable of being activated at the same time when the allocation conflicts.

11. The method of claim 10, wherein the configuring the client computer to determine further comprises:

configuring the client computer to determine whether the allocation exceeds capacity of the simulated logically-partitioned computer.

12. The method of claim 10 wherein the configuring the client computer to determine further comprises:

configuring the client computer to determine whether the simulated resource is restricted to exclusive allocation.

13. The method of claim 12, wherein the configuring the client computer to determine whether the allocation conflicts further comprises:

configuring the client computer to determine that the simulated resource has already been allocated to a previously simulated partition and that the simulated resource is restricted to the exclusive allocation.

14. The method of claim 10, further comprising:

configuring the client computer to receive the order via the user interface.

* * * * *